US011175527B2

(12) United States Patent
Hu et al.

(10) Patent No.: US 11,175,527 B2
(45) Date of Patent: Nov. 16, 2021

(54) REFLECTIVE COLOR FILTER SUBSTRATE, METHOD FOR DRIVING THE SAME, DISPLAY PANEL, AND DISPLAY DEVICE

(71) Applicants: Fuzhou BOE Optoelectronics Technology Co., Ltd., Fujian (CN); BOE Technology Group Co., Ltd., Beijing (CN)

(72) Inventors: Ye Hu, Beijing (CN); Wen Zha, Beijing (CN); Xin Chen, Beijing (CN); Qingna Hou, Beijing (CN)

(73) Assignees: Fuzhou BOE Optoelectronics Technology Co., Ltd., Fuqing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/553,637

(22) Filed: Aug. 28, 2019

(65) Prior Publication Data
US 2020/0319500 A1 Oct. 8, 2020

(30) Foreign Application Priority Data
Apr. 4, 2019 (CN) .......................... 201910270183.1

(51) Int. Cl.
*G02F 1/1335* (2006.01)
*G02F 1/1676* (2019.01)
(Continued)

(52) U.S. Cl.
CPC ....... *G02F 1/133514* (2013.01); *G02B 5/136* (2013.01); *G02B 5/201* (2013.01);
(Continued)

(58) Field of Classification Search
None
See application file for complete search history.

(56) References Cited

U.S. PATENT DOCUMENTS 6,486,866 B1  11/2002  Kuwahara et al.
2001/0055089 A1*  12/2001  Van De Witte ... G02F 1/133516
349/185
(Continued)

FOREIGN PATENT DOCUMENTS

CN  1973237 A  5/2007
CN  101750732 A  6/2010
(Continued)

OTHER PUBLICATIONS

Office Action for corresponding Chinese Application No. 201910270183.1 dated Apr. 26, 2021.

*Primary Examiner* — Edward J Glick
*Assistant Examiner* — David Y Chung
(74) *Attorney, Agent, or Firm* — Arent Fox LLP; Michael Fainberg

(57) ABSTRACT

Disclosed are a reflective color filter substrate and driving method thereof, and a display panel and a display device. The substrate includes color-resist elements in an array, each color-resist element includes a first and second electrode arranged opposite to each other, and a color-resist structure located between the first and second electrodes; and in each color-resist element: the first electrode is a light-transmission electrode; the first and second electrodes are configured to generate a first electric field, and the color-resist elements are configured to be driven by the first electric field to reflect light rays incident on the first electrode as monochromatic light; and the first and second electrodes are configured to generate a second electric field, and the color-resist elements are configured to be driven by the second electric field to reflect the light rays incident on the first electrode as hybrid light of monochromatic light and white light.

14 Claims, 13 Drawing Sheets

(51) Int. Cl.
 *G02B 5/20* (2006.01)
 *G02B 26/02* (2006.01)
 *G02B 5/136* (2006.01)
 *F21V 8/00* (2006.01)
 *G09G 3/20* (2006.01)

(52) U.S. Cl.
 CPC ........... *G02B 6/005* (2013.01); *G02B 26/023* (2013.01); *G02F 1/1676* (2019.01); *G09G 3/2003* (2013.01)

(56) References Cited

U.S. PATENT DOCUMENTS

| | | | |
|---|---|---|---|
| 2007/0263306 A1 | 11/2007 | Hayes et al. | |
| 2010/0128341 A1* | 5/2010 | Cheng | G02B 26/005 359/292 |
| 2010/0134407 A1* | 6/2010 | Wang | G02F 1/167 345/107 |
| 2013/0114127 A1 | 5/2013 | Wang et al. | |
| 2014/0177031 A1 | 6/2014 | Lin | |
| 2018/0329268 A1 | 11/2018 | Li et al. | |
| 2019/0079329 A1 | 3/2019 | Li | |

FOREIGN PATENT DOCUMENTS

| | | |
|---|---|---|
| CN | 106909011 A | 6/2017 |
| CN | 107357081 A | 11/2017 |
| TW | 201022816 A | 6/2010 |

\* cited by examiner

Apply first driving voltage to the first electrode, and reference voltage to the second electrode in each color-resist element in the first mode so that the first electric field is created between the first electrode and the second electrode, and the color-resist element is driven by the first electric field to reflect the light rays incident on the first electrode as monochromatic light ~ 101

Apply second driving voltage to the first electrode, and the reference voltage to the second electrode in each color-resist element in the second mode so that the second electric field is created between the first electrode and the second electrode, and the color-resist element is driven by the second electric field to reflect the light rays incident on the first electrode as hybrid monochromatic light and white light ~ 102

Apply third driving voltage to the first electrode, and the reference voltage to the second electrode in each color-resist element in the third mode so that a third electric field is created between the first electrode and the second electrode, and the color-resist element is driven by the third electric field to reflect the light rays incident on the first electrode as white light ~ 103

Fig. 6

REFLECTIVE COLOR FILTER SUBSTRATE, METHOD FOR DRIVING THE SAME, DISPLAY PANEL, AND DISPLAY DEVICE

CROSS-REFERENCE TO RELATED APPLICATION

This application claims priority of Chinese Patent Application No. 201910270183.1, filed on Apr. 4, 2019, which is hereby incorporated by reference in its entirety.

FIELD

The present disclosure relates to the field of display technologies, and particularly to a reflective color filter substrate, a method for driving the same, a display panel, and a display device.

BACKGROUND

A reflective solution crystal display is well readable under outdoor sunlight due to its lower power consumption, low cost, and other advantages, and since color information is provided by reflecting an external light source using a display element, ambient light in a dark room may be too low to be reflected to lighten a screen of a legacy RGB reflective display.

SUMMARY

Some embodiments of the disclosure provide a reflective color filter substrate including color-resist elements arranged in an array, wherein the color-resist elements includes a first electrode and a second electrode arranged opposite to each other, and a color-resist structure located between the first electrode and the second electrode; and in the color-resist elements:

the first electrode is a light-transmission electrode;

the first electrode and the second electrode are configured to generate a first electric field, and the color-resist elements are configured to be driven by the first electric field to reflect light rays incident on the first electrode as monochromatic light; and the first electrode and the second electrode are configured to generate a second electric field, and the color-resist elements are configured to be driven by the second electric field to reflect the light rays incident on the first electrode as hybrid light of monochromatic light and white light.

In an optional embodiment, the first electrode and the second electrode are further configured to generate a third electric field, and the color-resist elements are configured to be driven by the third electric field to reflect the light incident on the first electrode as white light.

In an optional embodiment, the first electrodes of the color-resist elements are structured integral, and the second electrodes of the color-resist elements are structured integral.

In an optional embodiment, the second electrodes are light-reflective electrodes;

the color-resist structure includes a dielectric layer, a hydrophobic layer, and monochromatic non-polar solution and transparent polar solution located between the hydrophobic layer and the first electrode, arranged successively from the second electrode to the first electrode;

the reflecting color filter substrate further includes blocking walls located between the color-resist elements to isolate the solution of adjacent color-resist elements from each other; and the non-polar solution in the color-resist elements is driven by the first electric field to be spread on the hydrophobic layer, and to cover all of the hydrophobic layer, and driven by the second electric field to be accumulated toward one of the first blocking walls, and to cover a part of the hydrophobic layer.

In an optional embodiment, the blocking walls are black.

In an optional embodiment, the non-polar solution in the color-filter elements is driven by a third electric field to be adhered on one of the blocking walls.

In an optional embodiment, a ratio of an area of the orthographic projection of the non-polar solution onto the hydrophobic layer to an area of the hydrophobic layer corresponding to the color-resist elements is from 10% to 50% due to a driven of the second electric field, and a ratio of the area of the orthographic projection of the non-polar solution onto the hydrophobic layer to the area of the hydrophobic layer corresponding to the color-resist elements is not greater than 5% due to the driven of third electric field.

In an optional embodiment, the reflective color filter substrate further includes blocking walls located between the color-resist elements to define the color-resist elements as a closed space;

the color-resist elements includes electro-phoretic solution located in the closed space, and electro-phoretic particles distributed in the electro-phoretic solution, and the electro-phoretic particles include monochromatic particles and white particles; and in the color-resist elements, the monochromatic particles are proximate to the first electrode, and the white particles are proximate to the second electrode, due to a driven of the first electric field.

In an optional embodiment, in the color-resist elements, the white particles are proximate to the first electrode, and the monochromatic particles are proximate to the second electrode, due to a driven of the third electric field.

In an optional embodiment, the electro-phoretic particles further include black particles;

the first electrode and the second electrode are further configured to generate a fourth electric field; and in the color-resist elements, the black particles are proximate to the first electrode, and the particles in other colors are proximate to the second electrode side, due to a driven of the fourth electric field.

In an optional embodiment, a charge polarity of the monochromatic particles is identical to that of the black particles, and an absolute value of threshold voltage, and a mobility of the monochromatic particles are greater than those of the black particles respectively, or the absolute value of the threshold voltage, and the mobility of the black particles are greater than those of the monochromatic particles respectively; and the charge polarity of the white particles is opposite to the charge polarity of the monochromatic particles.

Some embodiments of the disclosure provide a display panel including the reflective color filter substrate according to any one of the technical solutions above.

In an optional embodiment, the display panel further includes a transmission solution crystal display module, and a circularly polarizing structure located on a light exit side of the transmission solution crystal display module; and the reflective color filter substrate is located on a side of the transmission solution crystal display module away from the circularly polarizing structure.

Some embodiments of the disclosure provide a display device including the display panel according to any one of the technical solutions above.

Some embodiments of the disclosure provide a method for driving the reflective color filter substrate according to any one of the technical solutions above, the color filter substrate being capable of operating in a first mode and a second mode, wherein the method includes:

applying a first driving voltage to the first electrode, and a reference voltage to the second electrode in the color-resist elements in the first mode so that the first electric field is generated between the first electrode and the second electrode, and light rays incident on the first electrode are reflected as monochromatic light; and applying a second driving voltage to the first electrode, and the reference voltage to the second electrode in the color-resist elements in the second mode so that the second electric field is generated between the first electrode and the second electrode, and the light rays incident on the first electrode are reflected as hybrid light of monochromatic light and white light.

In an optional embodiment, the color filter substrate being further capable of operating in a third mode, and the driving method further includes:

applying a third driving voltage to the first electrode, and the reference voltage to the second electrode in the color-resist elements in the third mode so that a third electric field is generated between the first electrode and the second electrode, and the light rays incident on the first electrode are reflected as white light.

In an optional embodiment, the color-resist structure in the color filter substrate includes electro-phoretic solution, and electro-phoretic particles distributed in the electro-phoretic solution; the electro-phoretic particles include monochromatic particles and white particles; a charge polarity of the white particles is opposite to a charge polarity of the monochromatic particles; wherein the white particles are proximate to the first electrode side, and the monochromatic particles are proximate to the second electrode side, due to a driven of the third electric field; and wherein the reference voltage is ground voltage, and a polarity of the first driving voltage is opposite to that of the third driving voltage.

In an optional embodiment, he electro-phoretic particles in the color filter substrate further includes black particles, a charge polarity of the black particles is identical to that of the monochromatic particles;

the color filter substrate being further capable of operating in a fourth mode of the color filter substrate; in the fourth mode, a fourth electric field is generated between the first electrode and the second electrode in the color-resist elements, wherein the black particles are proximate to the first electrode side, and the particles in other colors are proximate to the second electrode side, due to a driven of the fourth electric field; and an absolute value of threshold voltage, and a mobility of the black particles are greater than those of the monochromatic particles respectively, and the driving method includes:

applying a fourth driving voltage to the first electrode, and the reference voltage to the second electrode in the color-resist elements in the fourth mode so that the fourth electric field is generated between the first electrode and the second electrode, wherein an absolute value of the fourth driving voltage is greater than the absolute value of the threshold voltage of the black particles, and an absolute value of the first driving voltage, and an absolute value of the second driving voltage are greater than the absolute value of the threshold voltage of the monochromatic particles, and less than the absolute value of the threshold voltage of the black particles respectively, or an absolute value of threshold voltage, and a mobility of the monochromatic particles are greater than those of the black particles respectively, and the driving method includes:

applying a fourth driving voltage to the first electrode, and the reference voltage to the second electrode in the color-resist element in the fourth mode so that the fourth electric field is generated between the first electrode and the second electrode, wherein an absolute value of the fourth driving voltage is greater than the absolute value of the threshold voltage of the black particles, and less than the absolute value of the threshold voltage of the monochromatic particles, and the absolute value of the first driving voltage, and the absolute value of the second driving voltage respectively are greater than the absolute value of threshold voltage of the monochromatic particles.

In an optional embodiment, before the driving voltage is applied to the first electrode in the first mode, the second mode, the third mode or the fourth mode, the method further includes: applying a pre-voltage to the first electrode, wherein the pre-voltage is configured to make the electrophoretic particles float.

In an optional embodiment, the pre-voltage is further configured to separate the white particles and the monochromatic particles in a direction from the first electrode to the second electrode in the second mode.

BRIEF DESCRIPTION OF THE DRAWINGS

FIG. 6 is a schematic flow chart of a method for driving a reflective color filter substrate according to some embodiments of the disclosure.

DETAILED DESCRIPTION OF THE EMBODIMENTS

In the related art, there is another RGBW-enabled reflective display in which the brightness of the display is improved by arranging a white sub-pixel in addition to legacy RGB sub-pixels so that more reflected light enters the eyes of a user given incident light to thereby address the problems of low brightness and high power consumption in the reflective display to some extent. However the RGBW reflective display may not be applicable in the case of high ambient light; and the ratios of the numbers of respective RGB sub-pixels to the total number of sub-pixels are reduced from ⅓ in the RGB reflective display to ¼ in the RGBW reflective display, thus discouraging an experience of the user in terms of the granularity of color rendering to some extent. Therefore, the existing reflective solution crystal display may not satisfy different display demands, and thus may be less universal.

The technical solutions according to the embodiments of the disclosure will be described below clearly and fully with reference to the drawings in the embodiments of the disclosure. Apparently the embodiments to be described are only a part but all of the embodiments of the disclosure. Based upon the embodiments here of the disclosure, all of other embodiments which can occur to those ordinarily skilled in the art without any inventive effort shall come into the scope of the disclosure as claimed.

Figure 1A:
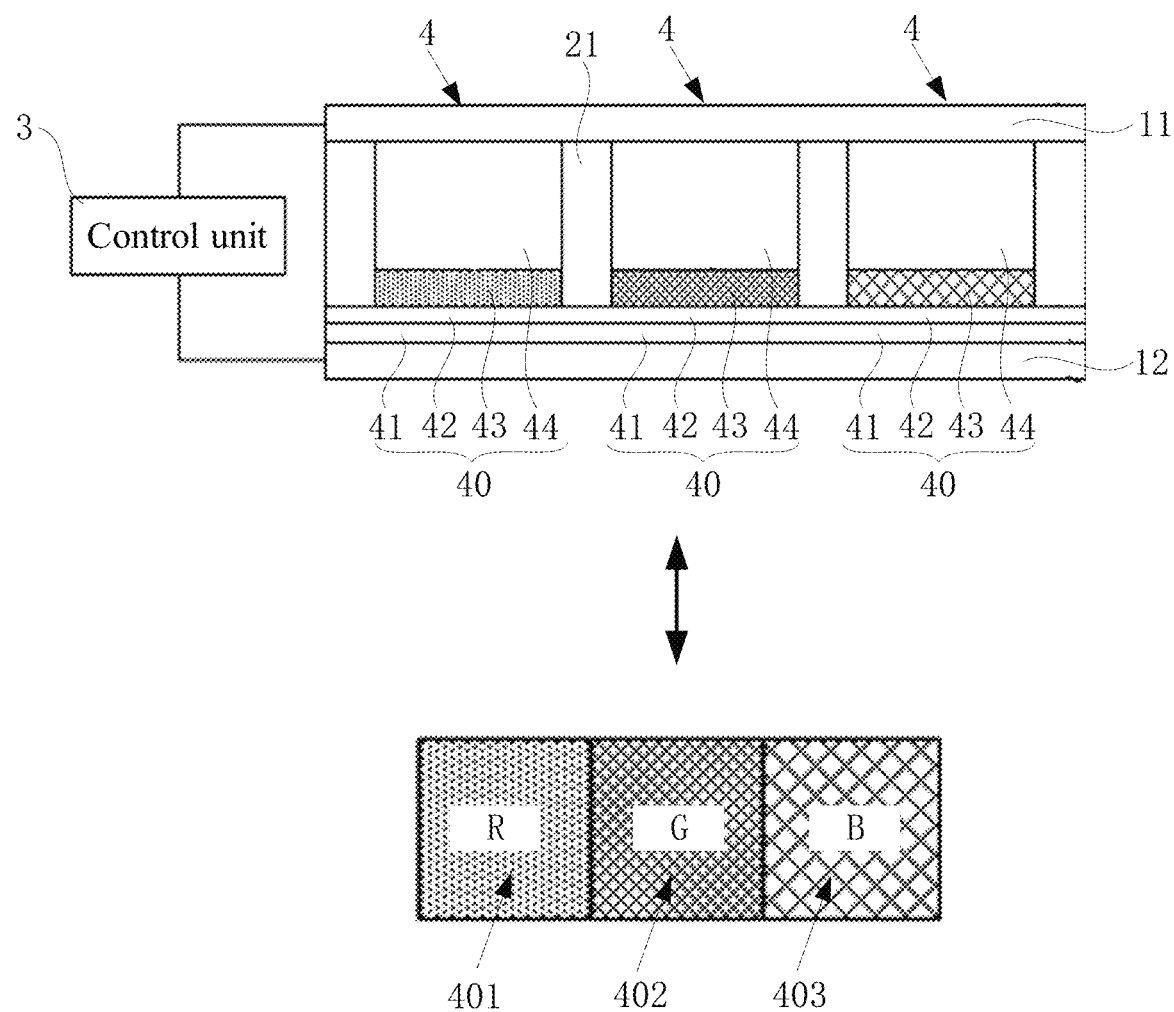
FIG. 1A is schematic structural diagrams of a part of a reflective color filter substrate according to some embodiments of the disclosure in a first mode in a sectional view and a corresponding top view.
Figure 1B:
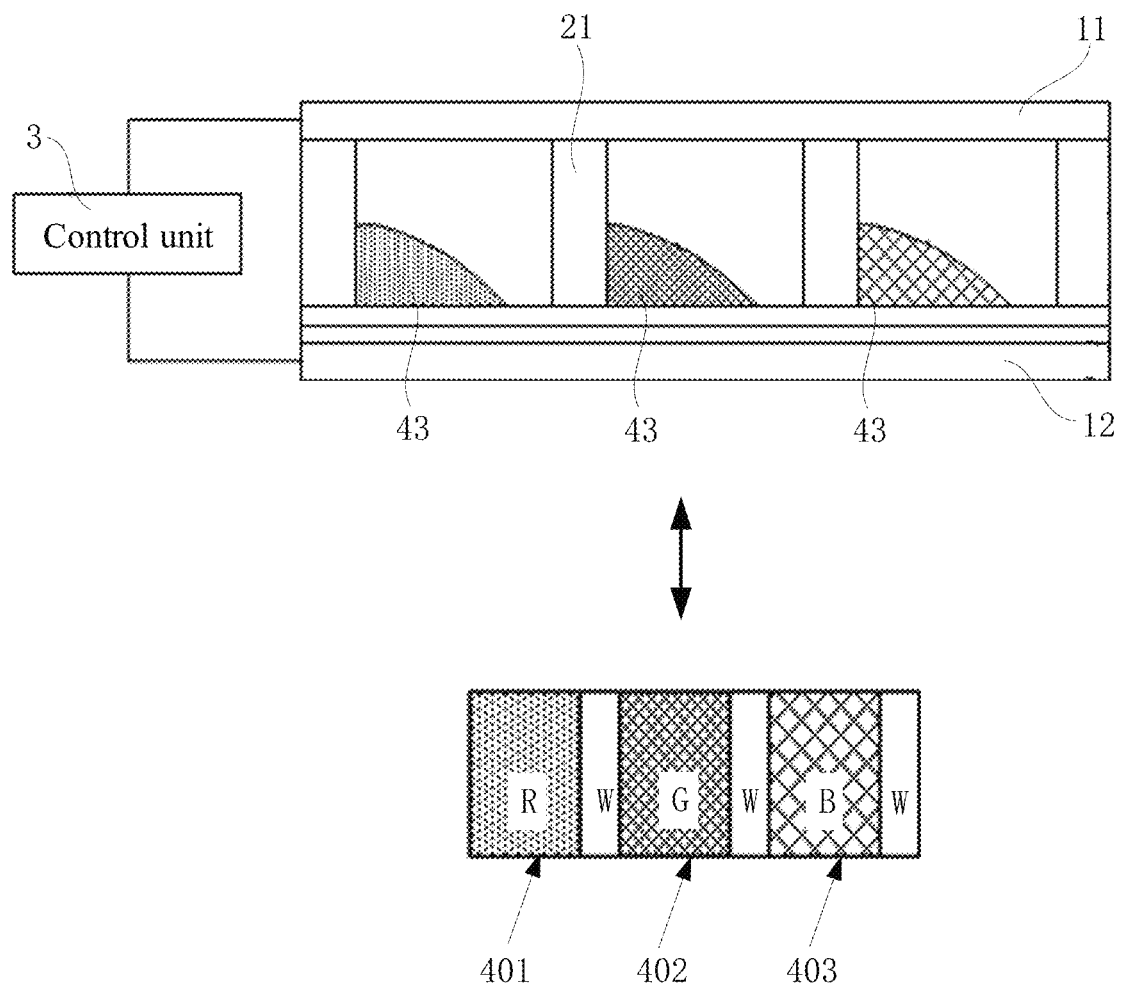
FIG. 1B is schematic structural diagrams of a part of the reflective color filter substrate as illustrated in FIG. 1A in a second mode in a sectional view and a corresponding top view.
Figure 1C:
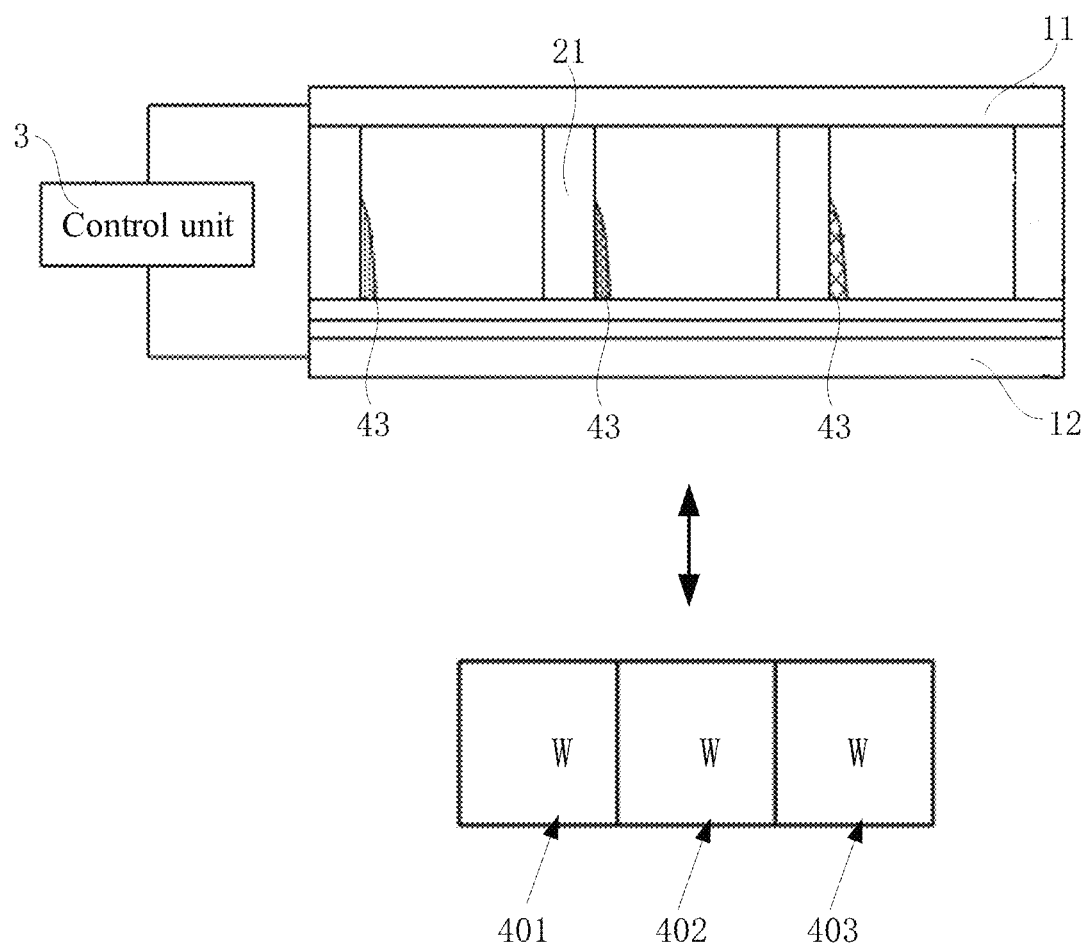
FIG. 1C is schematic structural diagrams of a part of the reflective color filter substrate as illustrated in FIG. 1A in a third mode in a sectional view and a corresponding top view.
Figure 2A:
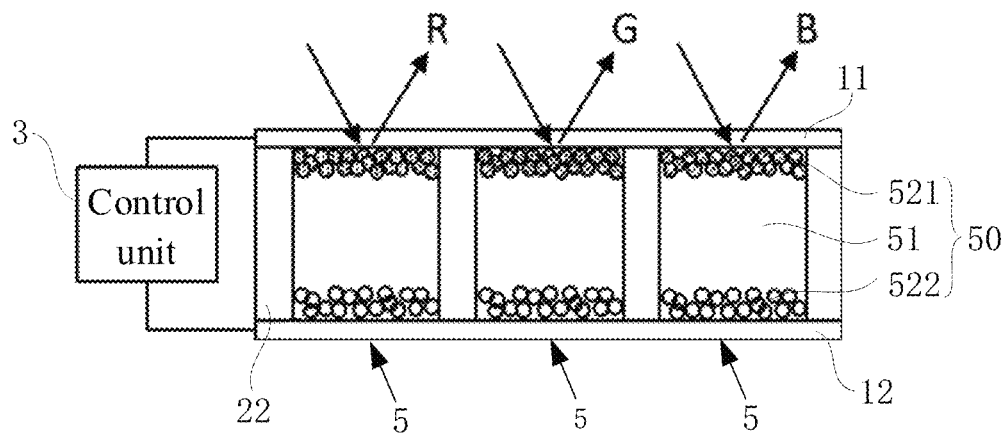
FIG. 2A is schematic structural diagrams of a part of a reflective color filter substrate according to another embodiment of the disclosure in a first mode in a sectional view and a corresponding top view.
Figure 2B:
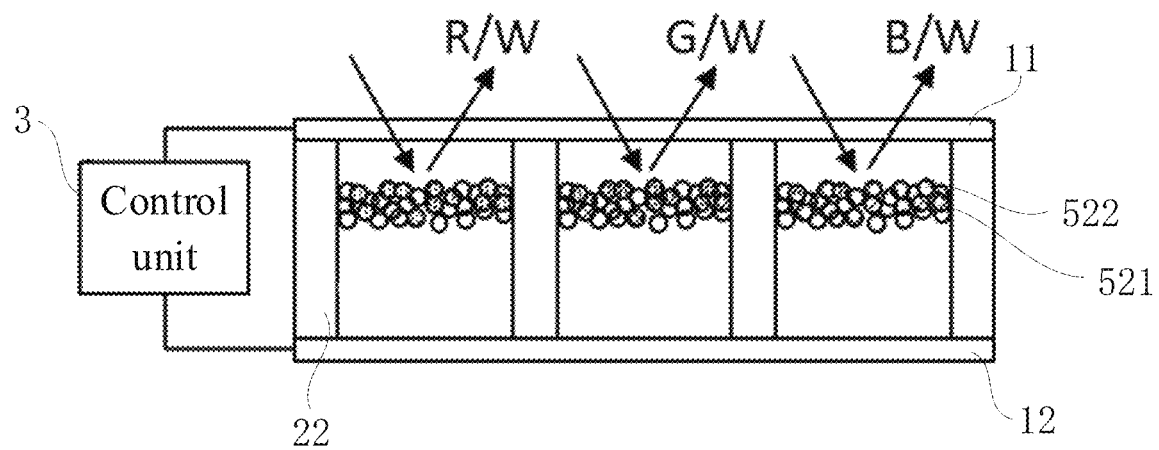
FIG. 2B is schematic structural diagrams of a part of the reflective color filter substrate as illustrated in FIG. 2A in a second mode in a sectional view and a corresponding top view.
Figure 2C:
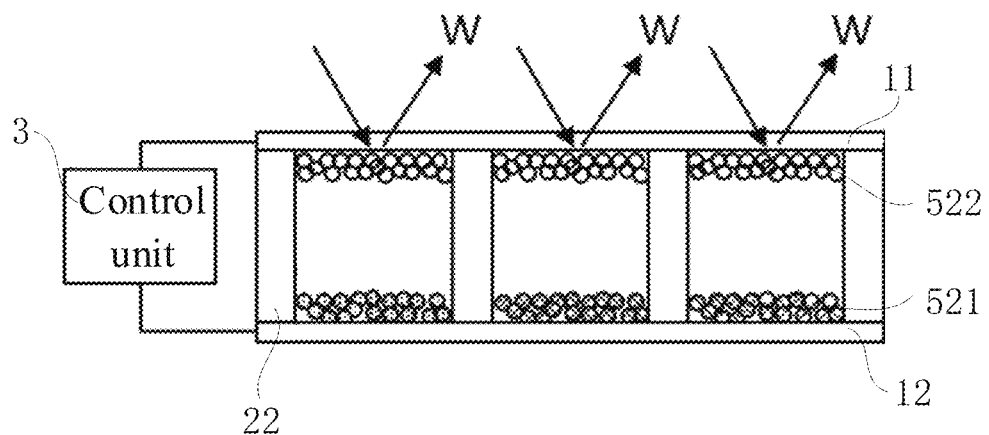
FIG. 2C is schematic structural diagrams of a part of the reflective color filter substrate as illustrated in FIG. 1A in a third mode in a sectional view and a corresponding top view.
Figure 3A:
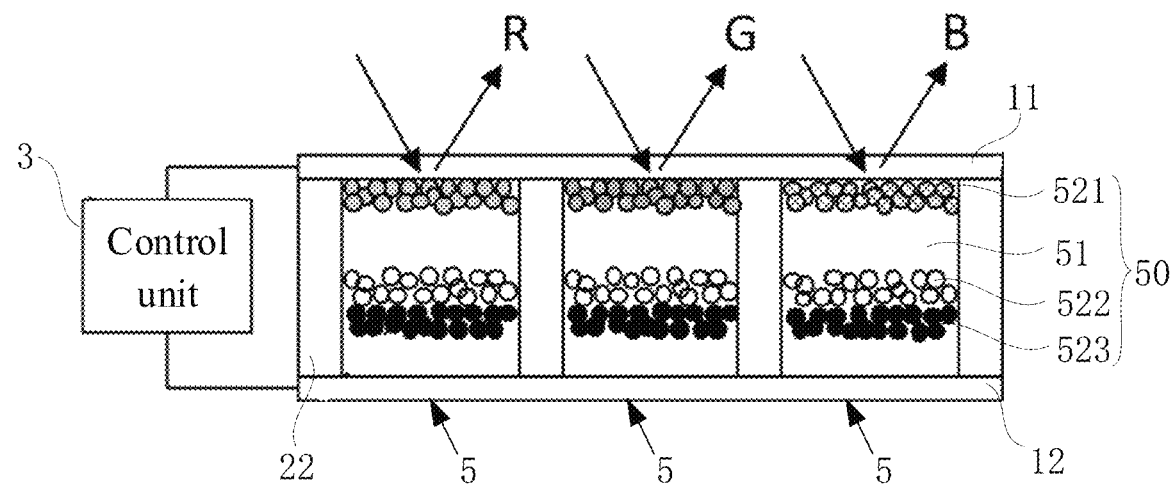
FIG. 3A is a schematic structural diagram of a part of a reflective color filter substrate according to still another embodiment of the disclosure in a first mode in a sectional view, and a schematic diagram of light rays reflected on the reflective color filter substrate.

In a first aspect, as illustrated in FIG. 1A to FIG. 3D, some embodiments of the disclosure provide a reflective color filter substrate including color-resist elements arranged in an array, e.g., color-resist element 4 in FIG. 1A, color-resist element 5 in FIG. 2A and FIG. 3A, etc., where each color-resist element includes a first electrode 11 and a second electrode 12 arranged opposite to each other, and a color-resist structure located between the first electrode 11 and the second electrode 12, and for example, each color-resist element 4in FIG. 1A includes a first electrode 11, a second electrode 12, and a color-resist structure 40, and each color-resist element 5 in FIG. 2A and FIG. 3A includes a first electrode 11, a second electrode 12, and a color-resist structure 50; and in each color-resist element:

the first electrode 11 is a light-transmission electrode;

the first electrode 11 and the second electrode 12 are configured to create a first electric field, and the color-resist element is configured to be driven by the first electric field to reflect light rays incident on the first electrode 11 as monochromatic light.

The first electrode 11 and the second electrode 12 are configured to create a second electric field, and the color-resist element is configured to be driven by the second electric field to reflect the light rays incident on the first electrode 11 as hybrid light of monochromatic light and white light.

In the reflective color filter substrate above, the color-resist elements correspond to display sub-pixels in a one-to-one manner, and there are two different modes of the respective color-resist elements, where the color-resist elements reflect monochromatic light in the first mode, and reflect hybrid light of monochromatic light and white light in the second mode, so the color-resist elements can be switched between the two modes so that the color filter substrate can be switched between an all-color reflection mode and a hybrid white-color reflection mode, and furthermore when the reflective color filter substrate is applied to a reflective display device, the reflective display device can be switched between a darker all-color reflection state and the brighter hybrid white-color reflection state to thereby improve the universality of the reflective display device so as to satisfy display demands in different brightness environments.

Figure 3B:
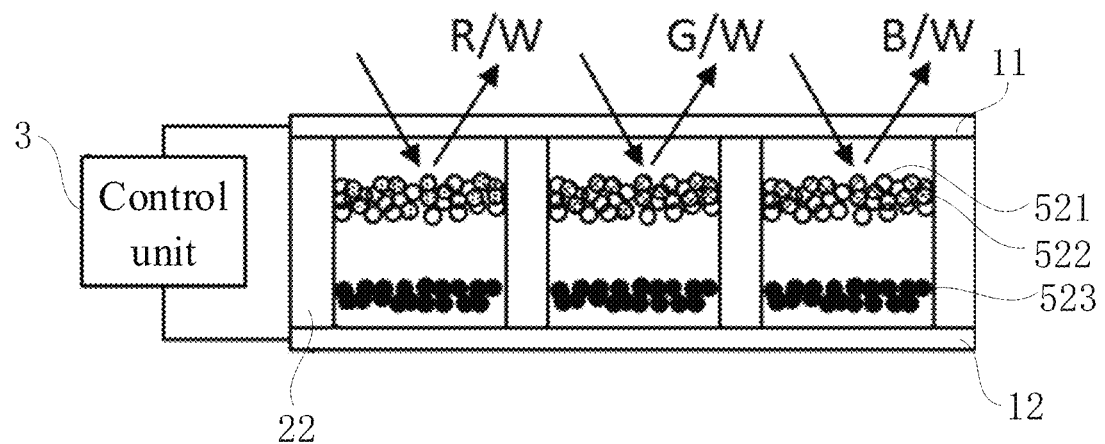
FIG. 3B is a schematic structural diagram of a part of the reflective color filter substrate as illustrated in FIG. 3A in a second mode in a sectional view, and a schematic diagram of light rays reflected on the reflective color filter substrate.

For example, the color filter substrate operates in the all-color reflection mode in a brighter outdoor environment so that the respective color-resist elements can reflect corresponding monochromatic light in colors of the sub-pixels corresponding to the respective color-resist elements, and the corresponding monochromatic light can exit the sub-pixels corresponding to the respective color-resist elements in the display device, and at this time, the display device operates in the all-color display state; and the color filter substrate operates in the hybrid white-color reflection mode in a darker indoor environment so that the respective color-resist elements can reflect both corresponding monochromatic light and white light, so both the corresponding monochromatic light and the white light can exit the sub-pixels corresponding to the respective color-resist elements in the display device, and at this time, the display device operates in the white-color display state to thereby improve the display brightness so as to satisfy the requirement on the display brightness. By way of an example, the reflective color filter substrate above includes red, green, and blue color-resist elements corresponding respectively to red, green, and blue sub-pixels; as illustrated in FIG. 1A, FIG. 2A, and FIG. 3A, while the color filter substrate is operating in the all-color reflection mode, the red, green, and blue color-resist elements reflect corresponding red light R, green light and blue light B respectively, and at this time, the display device operates in the all-color display state; and as illustrated in FIG. 1B, FIG. 2B, and FIG. 3B, while the color filter substrate is operating in the hybrid white-color reflection mode, the red, green, and blue color-resist elements reflect both corresponding red light R, green light G and blue light B respectively, and white light W, and both the corresponding white and the white light can exit the sub-pixels corresponding to the respective color-resist elements in the display device, and at this time, the display device operates in the white-color display state.

Furthermore, in the reflective color filter substrate above, although there is the hybrid white-color reflection mode, no white color-resist elements are arranged, that is, the numbers of color-resist elements in the respective colors (e.g., the red, green, and blue color-resist elements), and their proportion do not vary across the different modes, so the color filter substrate can display an image at a fine granularity in color.

By way of an example, as illustrated in FIG. 1A to FIG. 3D, the first electrodes 11 of the respective color-resist elements can be structured integral, that is, the first electrodes 11 of the respective color-resist elements are located at an integral electrode layer on one sides of the respective color-resist elements; and alike the second electrodes 12 of the respective color-resist elements can be structured integral, that is, the second electrodes 12 of the respective color-resist elements are located at an integral electrode layer on the other sides of the respective color-resist elements. Furthermore the electrode layers can be driven to create a first electric field, a second electric field, or a third electric field in the respective color-resist elements to thereby switch the respective color-resist element between the modes so as to switch the entire color filter substrate between the modes.

By way of an example, as illustrated in FIG. 2A to FIG. 3D, in the color filter substrate above, the first electrodes 11 are transmission electrodes, and light rays can be incident on the first electrodes 11, and reflected by the color-resist elements, and then exit the first electrodes 11 so that the color of the light rays is modulated, where the color filter substrate can be referred to as a "reflective color filter substrate"; and since the modulation mode of the respective color-resist elements is switched under the action of the electric field created between the first electrodes 11 and the second electrodes 12, the color filter substrate can also be referred to as an "electrically adjustable color filter substrate".

Furthermore, as illustrated in FIG. 1A to FIG. 3D, the color filter substrate above can further include an electric control unit 3, electrically connected with the first electrodes 11 and/or the second electrodes 12, configured to control the mode of the color-resist element to be switched.

Figure 3C:
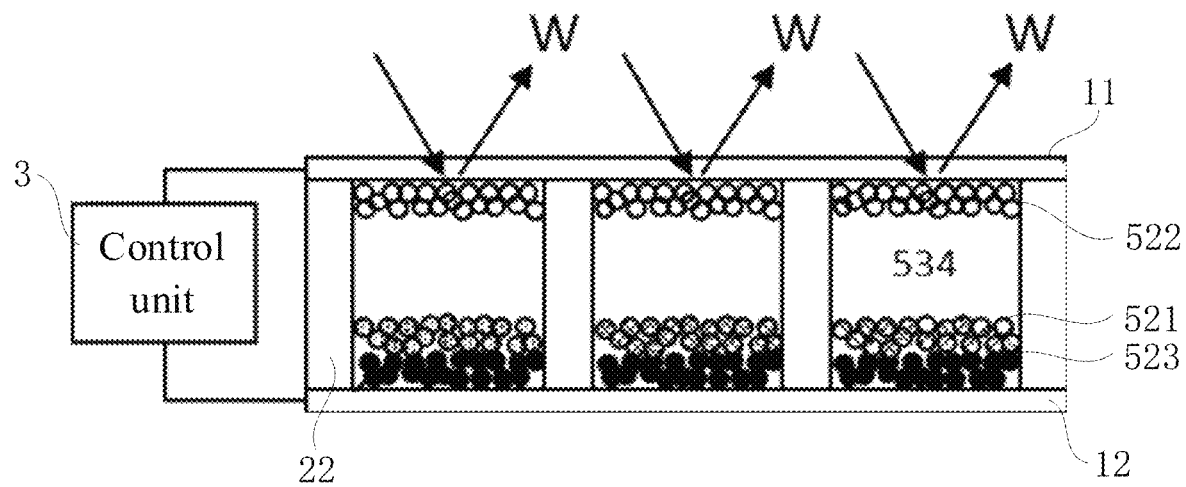
FIG. 3C is a schematic structural diagram of a part of the reflective color filter substrate as illustrated in FIG. 3A in a third mode in a sectional view, and a schematic diagram of light rays reflected on the reflective color filter substrate.

In a particular embodiment, the first electrodes 11 and the second electrodes 12 can be further configured to create a third electric field; and as illustrated in FIG. 1C, FIG. 2C, and FIG. 3C, the color-resist elements are configured to be driven by the third electric field to reflect the light incident on the first electrodes 11 as white light W, that is, there is also a third mode of the respective color-resist elements in which the color-resist element reflect white light W, and at this time, the reflective color filter substrate operates in an all-white reflection mode, and the reflective display device to which the reflective color filter substrate is applied operates in an all-white display state.

Optionally, in order to display an image on the display device in the related art in the white state, incident light shall be transmitted through a color filter layer so that at least ⅔ of the light source may be lost; and in the color filter substrate according to the embodiment of the disclosure, incident light from the outside can be reflected directly as white light to thereby reduce in effect a loss of the light source so as to greatly improve the brightness of the display device in the white state, and to lower power consumption in effect.

In a particular embodiment, the reflective color filter substrate according to the embodiment of the disclosure can be embodied in an electrowetting structure (in the structure as illustrated in FIG. 1A to FIG. 1C) or an electro-phoretic structure (or electronic paper in the structure as illustrated in FIG. 2A to FIG. 3D), and the reflective color filter substrate according to the embodiment of the disclosure will be described below taking these two structures as an example.

A first embodiment relates to an electrowetting structure.

In a particular embodiment, the second electrode 12 is a light-reflective electrode with a high reflectivity for visible light rays, and as illustrated in FIG. 1A, each color-resist structure 40 includes a dielectric layer 41, a hydrophobic layer 42, and monochromatic non-polar solution 43 and transparent polar solution 44 located between the hydrophobic layer 42 and the first electrode 11, arranged in that order from the second electrode 12 to the first electrode 11; and the reflecting color filter substrate further includes first blocking walls 21 located between the color-resist elements 4 to isolate the solution of the adjacent color-resist elements 4 from each other. Optionally, the first blocking walls 21 can be in black, and arranged between the first electrode 11 and the hydrophobic layers 42, where on one hand, the black blocking walls separate the color-resist elements 4 from each other to isolate the solution of the adjacent color-resist elements 4 from each other, and on the other hand, they can act as black matrixes of the entire display device to thereby prevent the incident light rays from being leaked between the color-resist elements 4.

Optionally, as illustrated in FIG. 1A, the non-polar solution 43 in each color-resist element 4 is driven by the first electric field to be spread on the hydrophobic layer 42, and to cover all of the hydrophobic layer 42, and at this time, the light rays incident on the first electrode 11 pass the monochromatic non-polar solution 43, and are finally reflected by the second electrode as monochromatic light, so that the respective color-resist elements 4 appear monochromatic, and the entire color filter substrate operates in the all-color reflection mode; and as illustrated in FIG. 1B, the non-polar solution 43 in each color-resist element 4 is driven by the second electric field to be accumulated toward the first blocking wall 21, and to cover a part of the hydrophobic layer 42, that is, a part of the surface of the hydrophobic layer 42 is covered with the non-polar solution 43, and the other part thereof is exposed to thereby expose a monochromatic block and a reflective electrode block with a different area ratio, and at this time, a part of the light rays incident on the first electrode 11 pass the monochromatic non-polar solution 43, and are reflected by the second electrode as monochromatic light, and the other part thereof are reflected directly by the second electrode 12 as white light, so that the respective color-resist elements 4 appear both monochromatic and white, and the entire color filter substrate operates in the white-color reflection mode.

Optionally, as illustrated in FIG. 1A, the intensity of the first electric field in the first mode can be zero, that is, the same voltage is applied to both the first electrode 11 and the second electrode 12, or no voltage is applied thereto, and at this time, a contact angle of the colored non-polar solution 43 at the hydrophobic layer 42 becomes smaller, and the colored non-polar solution 43 can be spread uniformly on the hydrophobic layer 42; and as illustrated in FIG. 1B, the intensity of the first electric field in the second mode can be zero, that is, voltage is applied to the first mode to thereby change voltage between the colored non-polar solution 43 and the hydrophobic layer 42 so as to increase the contact angle of the colored non-polar solution 43 so that the colored non-polar solution 43 can be accumulated toward the first blocking wall 21.

Optionally, as illustrated in FIG. 1B, the ratio of the area of the hydrophobic layer 42 covered with the non-polar solution 43 to the area of the hydrophobic layer 42 in each color-resist element 4 can be from 10% to 50%, e.g., 25%, due to the driving second electric field.

Optionally, for example, the sub-pixel elements include red sub-pixels, green sub-pixels, and blue sub-pixels as illustrated in FIG. 1A, and at this time, the color filter substrate correspondingly include red color-resist elements 401, green color-resist elements 402, and blue color-resist elements 403, where the non-polar solution 43 in the red color-resist elements 401 is colored red, the non-polar solution 43 in the green color-resist elements 402 is colored green, and the non-polar solution 43 in the blue color-resist elements 403 is colored blue.

The color filter substrate above can operate in the first mode when ambient light rays are bright as illustrated in FIG. 1A, where the colored non-polar solution 43 of the respective color-resist elements 4 is spread uniformly on the hydrophobic layers 42, and can selectively absorb the incident light, and at this time, the respective color-resist elements 4 operate under the same principle as the color filter films of the legacy transmission RGB color-resist elements except that the color filter substrate according to the embodiment of the disclosure reflects the light rays. A reflective display device to which the color filter substrate is applied operates in the RGB mode. When ambient light rays are dark, the electric control unit 3 can apply voltage to the first electrodes 11 and the second electrodes 12 so that the color filter substrate above is switched to the second mode as illustrated in FIG. 1B, and at this time, the colored non-polar solution 43 of the respective color-resist elements 4 is accumulated toward one sides of the first blocking walls 21 to some extent to thereby expose the monochromatic blocks and the reflective electrode blocks with different area ratios. In the respective color-resist elements 4, a part of the incident light is reflected directly by the reflective electrodes into the human eyes so that the user can perceive higher brightness of the screen, and at this time, a display pattern of the entire color filter substrate is similar to the legacy RGBW color filter sheets except that the color filter substrate according to the embodiment of the disclosure does not include the white color-resists W corresponding to the white sub-pixels, and the numbers of the red color-resist elements 401, the green color-resist elements 402, and the blue color-resist elements 403, and their proportion are the same as those in the RGB mode, so the display image of the color filter substrate according to the embodiment of the disclosure can be rendered at a finger granularity.

Furthermore, as illustrated in FIG. 1C, in the color filter substrate according to the embodiment of the disclosure, the non-polar solution 43 in each color-filter element 4 is driven by the third electric field to be adhered on the first blocking wall 21. At this time, all of the light rays incident on the first electrode 11 are reflected by the second electrode 12 as white light W, so the respective color-resist elements 4 appear white, and the entire color filter substrate operates in the all-white reflective mode.

Optionally, the electric control unit 3 can apply voltage to the first electrode 11 and the second electrode 12 to thereby change the voltage between the colored non-polar solution 43 and the hydrophobic 42 so as to increase the contact angle of the colored non-polar solution 43 on the hydrophobic 42 so that all of the colored non-polar solution 43 in the color-filter element 4 is absorbed on the first blocking wall 21, and at this time, the incident light in the respective color-filter elements 4 is transmitted through the transparent polar solution 44, reaches the second electrodes 12, is reflected by the second electrodes 12, and then enters the human eyes and is perceived as white light.

Optionally, as illustrated in FIG. 1C, the ratio of the area of a normal projection of the non-polar solution 43 onto the hydrophobic layer 42 to the area of the hydrophobic layer 42 in each color-resist element 4 is no greater than 5% due to the driving third electric field, and at this time, the influence of the monochromatic non-polar solution 43 upon the incident light rays can be neglected.

A second embodiment relates to an electro-phoretic structure (electronic paper).

In a particular embodiment, as illustrated in FIG. 2A and FIG. 3A, the reflective color filter substrate includes second blocking walls 22 located between the color-resist elements 5 to define the respective color-resist elements 5 as a closed space (which can be referred to as a closed chamber or a micro-capsule), where each color-resist element 5 includes electro-phoretic solution 51 located in the closed space, and electro-phoretic particles distributed in the electro-phoretic solution 51, and the electro-phoretic particles include monochromatic particles 521 and white particles 522. Optionally, the second blocking walls 22 can appear black, and they are arranged between the first electrodes 11 and the second electrodes 12 where on one hand, the black blocking walls separate the color-resist elements 5 from each other to isolate the solution of the adjacent electro-phoretic chambers from each other, and on the other hand, they can act as black matrixes of the entire display device to thereby prevent the incident light rays from being leaked between the color-resist elements.

The "white particles" are such particles that their color is the white, and "monochromatic particles" are such particles that their color is a monochromatic color, where the "monochromatic color" is another color than the black and the white. For example, the color-resist elements include red color-resist elements, green color-resist elements, and blue color-resist elements, and at this time, monochromatic particles in the red color-resist elements are red, monochromatic particles in the green color-resist elements are green, and monochromatic particles in the blue color-resist elements are blue.

Optionally, as illustrated in FIG. 2A and FIG. 3A, the monochromatic particles 521 and the white particles 522 are arranged in separate zones in each color-resist element 5 due to the driving first electric field, where the monochromatic particles 521 are located proximate to the first electrode 11 side, and the white particles 522 are proximate to the second electrode 12 side; and the light rays incident on the first electrode 11 side are reflected by the monochromatic particles 521 as monochromatic light (red light R, green light and blue light B), and at this time, the entire color filter substrate operates in the all-color reflective mode.

As illustrated in FIG. 2B and FIG. 3B, the monochromatic particles 521 and the white particles 522 are arranged in the same zone in each color-resist element 5 due to the driving second electric field, and the light rays incident on the first electrode 11 side can be reflected by both the monochromatic particles 521 and the white particles 522, and thus appear as hybrid monochromatic light and white light (red light R and white light W, green light G and white light W, and blue light B and white light W in FIG. 2B and FIG. 3B), and at this time, the entire color filter substrate operates in the white-color reflective mode.

Furthermore, as illustrated in FIG. 2C and FIG. 3C, the monochromatic particles 521 and the white particles 522 are arranged in separate zones in each color-resist element 5 due to the driving third electric field, where the white particles 522 are located proximate to the first electrode 11 side, and the monochromatic particles 521 are proximate to the second electrode 12 side; and the light rays incident on the first electrode 11 side are reflected by the white particles 522 as white light W, and at this time, the entire color filter substrate operates in the all-white reflective mode.

Optionally, each zone as referred to in the "separate zones" and the "same zone" described in this context is a zone defined in the direction from the first electrode to the second electrode, where the "separate zones" refer to that particles in different colors are separated from each other in the direction from the first electrode to the second electrode, and thus located in different zones, and at this time, the light rays incident on the first electrode are reflected by the particles in one of the colors in the zone proximate to the first electrode; and the "same" zone refers to that particles in different colors in the direction from the first electrode to the second electrode are mixed together, and all of them are located in a horizontal zone parallel to the extension direction of the first electrode, and at this time, the light rays incident on the first electrode are reflected by the particles in two or more colors in the same zone.

Optionally, there are different polarities of charges in a monochromatic particle 521 and a white particle 522, so they can be separated from or mixed with each other due to the different driving electric fields, so that the color filter substrate operates in one of the all-color, all-white, or hybrid white-color reflection modes.

For example, the white particles 522 are positively charged, and the monochromatic particles 521 are negatively charged. Particularly the electric control unit 3 applies a positive voltage signal to the first electrode 11, and a reference (ground) or negative voltage signal to the second electrode 12 so that the first electric field is created in the closed space of the photo-resist element 5, and at this time, as illustrated in FIG. 2A, the monochromatic particles 521 are absorbed by the first eclectic field to the first electrode 11 side proximate to an observer, and all of the light incident on the first electrode 11 side is reflected by the monochromatic particles 521 as monochromatic light, so the respective photo-resist elements 5 appear in the corresponding monochromatic color, and the entire color filter substrate operates in the all-color reflection mode; and the electric control unit 3 applies a negative voltage signal to the first electrode 11, and a reference (ground) or positive voltage signal to the second electrode 12 so that the second electric field is created in the closed space of the photo-resist element 5, and at this time, as illustrated in FIG. 2C, the white particles 522 are absorbed by the second eclectic field to the first electrode 11 side, and all of the light incident on the first electrode 11 side is reflected by the white particles 522 as white light, so the respective photo-resist elements 5 appear white, and the entire color filter substrate operates in the all-white reflection mode. Furthermore the electric control unit 3 applies the reference voltage to the second electrode 12, and firstly a positive voltage signal and then a negative voltage signal to the first electrode 11, where the amplitudes of the two driving voltage signals, and the durations of their waveforms are controlled so that the monochromatic particles 521 and the white particles 522 can be arranged in the same zone as illustrated in FIG. 2B, that is, the monochromatic particles 521 and the white particles 522 are mixed in a planar zone parallel to the first electrode 11, and at this time, a part of the incident light on the first electrode 11 side is reflected by the monochromatic particles 521 as monochromatic light, and the other part thereof is reflected by the white particles 522 as white light, so the respective photo-resist elements 5 appear in the hybrid monochromatic color and white, and the entire color filter substrate operates in the white-color reflection mode.

Figure 3D:
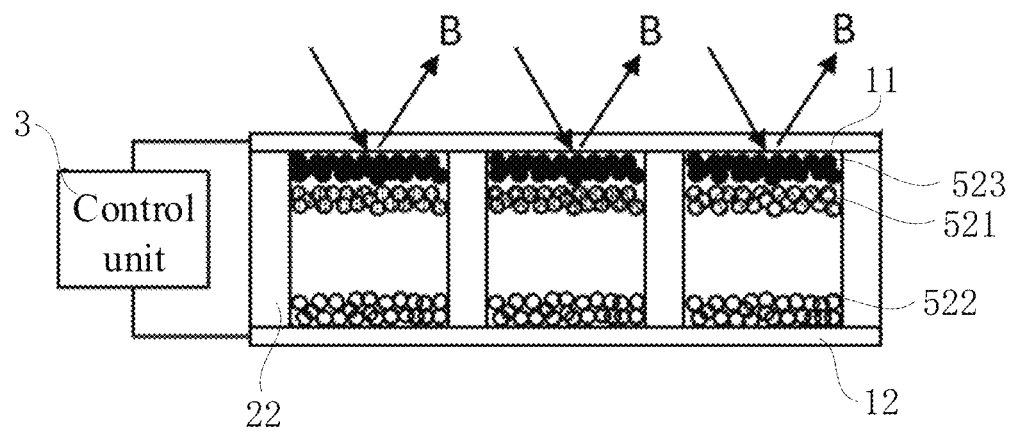
FIG. 3D is a schematic structural diagram of a part of the reflective color filter substrate as illustrated in FIG. 3A in a fourth mode in a sectional view, and a schematic diagram of light rays reflected on the reflective color filter substrate.

In a particular embodiment, as illustrated in FIG. 3A to FIG. 3D, the electro-phoretic particles can further include black particles 523, and optionally the first electrode 11 and the second electrode 12 are further configured to create a fourth electric field; and as illustrated in FIG. 3D, the black particles 523, and the particles in the other colors are arranged in separate zones in each color-resist element 5 due to the driving fourth electric field, where the black particles 523 are located proximate to the first electrode 11 side, and the particles in the other colors are proximate to the second electrode 12 side; and at this time, all of the light rays incident on the first electrode 11 side are reflected by the black particles 523, the respective color-resist elements 5 appear black B, and the entire color filter substrate operates in an all-black mode. Stated otherwise, when the electro-phoretic particles include the monochromatic particles 521, the white particles 522, and the black particles 523, there is also a fourth embodiment of the respective color-resist elements 5 in which the color-resist elements 5 absorb the incident light rays, and at this time, the reflective color filter substrate operates in the all-black mode, and the reflective display device to which the reflective color filter substrate is applied appears in an all-black display state.

Although the display device in the prior art (as common in the industry) can display a black image by adjusting the extent to which solution crystal elements are deflected, in a common driving scheme, light may typically be easily leaked while the black image is being displayed, because an optical film sheet may be arranged in error, the image may be observed at different angles of view, the solution crystal elements may be not deflected enough, etc.; and in the embodiment of the disclosure, the color filter substrate is made of an electronic paper film sheet so that the display device can operate in the all-black display mode by adjusting the operating mode of the electronic paper display film sheet to thereby prevent in effect light from being leaked while a black image is being displayed.

In a particular embodiment, the charge polarity of the monochromatic particles 521 is the same as the charge polarity of the black particles 523, the absolute value of threshold voltage of the monochromatic particles 521 is different from that of the black particles 523, the mobility of the monochromatic particles 521 is different from that of the black particles 523, and the charge polarity of the white particles 522 is opposite to the charge polarity of the monochromatic particles 521.

By way of an example, the absolute value of the threshold voltage, and the mobility of the monochromatic particles 521 are greater than those of the black particles 523 respectively, or the absolute value of the threshold voltage, and the mobility of the black particles 523 are greater than those of the monochromatic particles 521 respectively. For example, when the monochromatic particles 521 and the black particles 523 are positively charged, and the white particles 522 are negatively charged, the threshold voltage (where the threshold voltage is equal to the absolute thereof) and the mobility of the black particles 523 are greater than those of the monochromatic particles 521 respectively, or the threshold voltage and the mobility of the black particles 523 are less than those of the monochromatic particles 521.

In this way, the monochromatic particles 521 and the black particles 523 with the same charge polarity can be separated from each other more easily, that is, they can be arranged in separate zones more easily; and for example, the monochromatic particles 521 and the black particles 523 are positively charged, and the threshold voltage and the mobility of the black particles 523 are more than those of the monochromatic particles 521 respectively; and at this time, when driving voltage is above the threshold voltage of the black particles 523, both the black particles 523 and the monochromatic particles 521 can move, and since the mobility of the black particles 523 is higher than the mobility of the monochromatic particles 521, the former can reach the first electrode 11 and occupy the position of the first electrode 11 more quickly as illustrated in FIG. 3D, so the black display mode can be enabled; and when the driving voltage is below the threshold voltage of the black particles 523, and above the threshold voltage of the monochromatic particles 521, the black particles 523 will not move, and the monochromatic particles can move, so the color reflection mode (the mode as illustrated in FIG. 3A) or the white-color reflection mode (the mode as illustrated in FIG. 3B) can be enabled.

Optionally, the electro-phoretic particles (electronic paper) has a bi-stable characteristic, that is, after the driving voltage is stopped from being applied, the electro-phoretic particles are restricted in a "barrier" due to a plurality of balanced force fields including a Van der Waal force, a Coulomb force, a gravity, a buoyancy, a Brownian motion, etc., so the particles will be retained at their original positions unless a new image is displayed, and the driving voltage is applied so that the particles break away from the barrier, and accordingly the color filter substrate will be kept in the state of the original mode.

The "threshold voltage" refers to voltage applied from the outside so that the electro-phoretic particles keep away from the bi-stable state, and when the value of the voltage is less than the absolute value of the threshold voltage, the electro-phoretic particles are restricted in the barrier, so the particles will not move unless the value of the voltage reaches or exceeds the absolute value of the threshold voltage, stated otherwise, the "absolute value of the threshold voltage" is the value of the lowest voltage for the electro-phoretic particles to break away from the barrier, and to move again, and particularly can be determined by the size and/or the charge polarity of the electro-phoretic particles.

Furthermore, the "mobility" refers to the ratio of the moving speed of particles to the intensity of an electric field applied thereto, that is, particles with a higher mobility moves faster given an electric field.

In the reflective color filter substrate embodied in an electro-phoretic structure, the electric control unit 3 can enable the respective voltage driving schemes so that the display mode at the observer side is the black, white, color, or white-color display mode, and accordingly the display device displays a corresponding all-black, all-white, all-color (RGB), or a white-color (RGBW) image, that is, in the reflective color filter substrate according to the embodiment of the disclosure, the electro-phoretic driving scheme using three types of particles is applied so that the color filter substrate can operate in any one of the RGB, RGBW, all-black, and all-white modes to thereby improve the flexibility of the display device in operation. Furthermore power consumption for maintaining the operating mode of the color filter substrate can be further lowered due to the bi-stable characteristic of the electronic paper display elements as compared with the electrowetting elements.

In a second aspect, further to the color filter substrate according to any one of the embodiments above of the disclosure, some embodiments of the disclosure further provide a method for driving a color filter substrate which can operate in a first mode and a second mode and as illustrated in FIG. 6, the driving method includes the following steps.

The step 101 is to apply first driving voltage to the first electrode 11, and reference voltage to the second electrode 12 in each color-resist element in the first mode (an all-color reflection mode) so that the first electric field is created between the first electrode 11 and the second electrode 12, and the color-resist element 5 is driven by the first electric field to reflect the light rays incident on the first electrode 11 as monochromatic light.

The step 102 is to apply second driving voltage to the first electrode 11, and the reference voltage to the second electrode 12 in each color-resist element in the second mode (a white-color reflection mode) so that the second electric field is created between the first electrode 11 and the second electrode 12, and the color-resist element 5 is driven by the second electric field to reflect the light rays incident on the first electrode 11 as hybrid monochromatic light and white light.

Furthermore, there may also be a third mode (an all-white reflection mode) of the color filter substrate, and at this time, the driving method according to the embodiment of the disclosure further includes the following step.

The step 103 is to apply third driving voltage to the first electrode 11, and the reference voltage to the second electrode 12 in each color-resist element in the third mode so that a third electric field is created between the first electrode 11 and the second electrode 12, and the color-resist element 5 is driven by the third electric field to reflect the light rays incident on the first electrode 11 as white light.

Optionally, an order in which the steps 101, 102, and 103 above can be performed will not be limited to the order as described above, although the color filter substrate operates in the three driving modes as described above, and can be switched between the respective driving modes in response to an electric signal instruction.

Next the method for driving a color filter substrate according to the embodiment of the disclosure will be described by way of an example in which the first electrodes 11 of the respective color-resist elements are structured integral, and the second electrodes 12 of the respective color-resist elements are also structured integral.

By way of an example, when the color filter substrate is embodied in an electrowetting structure, the reference voltage above can be ground voltage, i.e., zero voltage, the first driving voltage can be the same as the reference voltage, the polarity of the second driving voltage can be the same as the polarity of the third driving voltage, the absolute value of the second driving voltage can be greater than that of the reference voltage, the absolute value of the third driving voltage can be greater than that of the second driving voltage, and the durations of the respective driving voltage can be equal to the lengths of time of the respective operating modes.

By way of an example, as illustrated in FIG. 2A to FIG. 2C, when the color filter substrate is embodied in an electro-phoretic structure (electronic paper), and electro-phoretic particles of the color-resist 5 include monochromatic particles 521 and white particles 522, the charge polarity of the white particles 522 can be opposite to that of the monochromatic particles 521; and at this time, in the driving method according to the embodiment of the disclosure, the reference voltage can be ground voltage, i.e., zero voltage, and the polarity of the first driving voltage is opposite to the polarity of the third driving voltage.

By way of an example, the first driving voltage is applied to the first electrode 11 to thereby create the first electric field in the color-resist element 5, and the monochromatic particles 521 and the white particles 522 move under the action of the first electric field until they are proximate to the first electrode 11 and the second electrode 12 respectively as illustrated in FIG. 2A; and at this time, the light rays incident on the first electrode 11 side are reflected by the monochromatic particles 521 in the respective color-resist elements 5, so that the color filter substrate operate in the first mode (the all-color reflection mode). The second driving voltage is applied to the first electrode 11 to thereby create the second electric field in the color-resist element 5, and the monochromatic particles 521 and the white particles 522 move to each other under the action of the second electric field until they reach the same zone, and thereafter the second electric field is removed, as illustrated in FIG. 2A; and at this time, the light rays incident on the first electrode 11 side are reflected by the monochromatic particles 521 and the white particles 522 in the respective color-resist elements 5, so that the color filter substrate operate in the second mode (the white-color reflection mode). The third driving voltage is applied to the first electrode 11 to thereby create the third electric field in the color-resist element 5, and the monochromatic particles 521 and the white particles 522 move under the action of the third electric field until they are proximate to the first electrode 11 and the second electrode 12 respectively as illustrated in FIG. 2C; and at this time, the light rays incident on the first electrode 11 side are reflected by the white particles 522 in the respective color-resist elements 5, so that the color filter substrate operate in the third mode (the all-white reflection mode).

By way of an example, as illustrated in FIG. 3A to FIG. 3D, when the color filter substrate is embodied in an electro-phoretic structure (electronic paper), and electro-phoretic particles of the photo-resist 5 include monochromatic particles 521, white particles 522, and black particles 523, the charge polarity of the white particles 522 is opposite to that of the monochromatic particles 521, and the charge polarity of the black particles 523 may be the same as that of the monochromatic particles 521; and at this time, the color filter substrate can further operate in a fourth mode in which a fourth electric field is created between the first electrode 11 and the second electrode 12, and as illustrated in FIG. 3D, the black particles 523, and the particles in the other colors can be arranged in separate zones in each photo-resist element 5 under the action of the fourth electric field, where the black particles 523 are proximate to the first electrode 11 side, and the particles in the other colors are proximate to the second electrode 12 side.

Optionally in this case, there may be the following two implementations of the driving method.

In a first implementation, the absolute value of threshold voltage, and the mobility of the black particles 523 are greater than those of the monochromatic particles 521 respectively, and at this time, the driving method includes:

in the fourth mode, fourth driving voltage is applied to the first electrode, and the reference voltage is applied to the second electrode 12, so that the fourth electric field is created between the first electrode 11 and the second electrode 12; the absolute value of the fourth driving voltage is greater than the absolute value of the threshold voltage of the black particles 523; and the absolute value of the first driving voltage, and the absolute value of the second driving voltage are greater than the absolute value of the threshold voltage of the monochromatic particles 521, and less than the absolute value of the threshold voltage of the black particles 523 respectively.

Since the absolute value of the fourth driving voltage is more than the absolute value of the threshold voltage of the black particles 523, both the black particles 523 and the monochromatic particles 521 can move under the action of the fourth driving voltage, and since the mobility of the black particles 523 is higher than the mobility of the monochromatic particles 521, the former can reach the first electrode 11 and occupy the position of the first electrode 11 faster, thus enabling a black display mode. The absolute value of the first driving voltage, and the absolute value of the second driving voltage are less than the absolute value of the threshold voltage of the black particles 523, so the black particles 523 will not move, and only the monochromatic particles 521 and the white particles 522 will move under the action of the first driving voltage and the second driving voltage, thus disabling the color reflection mode or the white-color reflection mode.

For example, the monochromatic particles 521 and the black particles 523 are positively charged, and the white particles 522 are negatively charged, so as illustrated in FIG. 4A to FIG. 4D, the threshold voltage of the black particles 523 is $V_B$, the threshold voltage of the monochromatic particles 521 is $V_C$, and the threshold voltage of the white particles 522 is $V_W$; and the reference voltage is 0, and the first driving voltage, the second driving voltage, the third driving voltage, and the fourth driving voltage is $V_1$, $V_2$, $V_3$, and $V_4$; respectively.

Figure 4A:
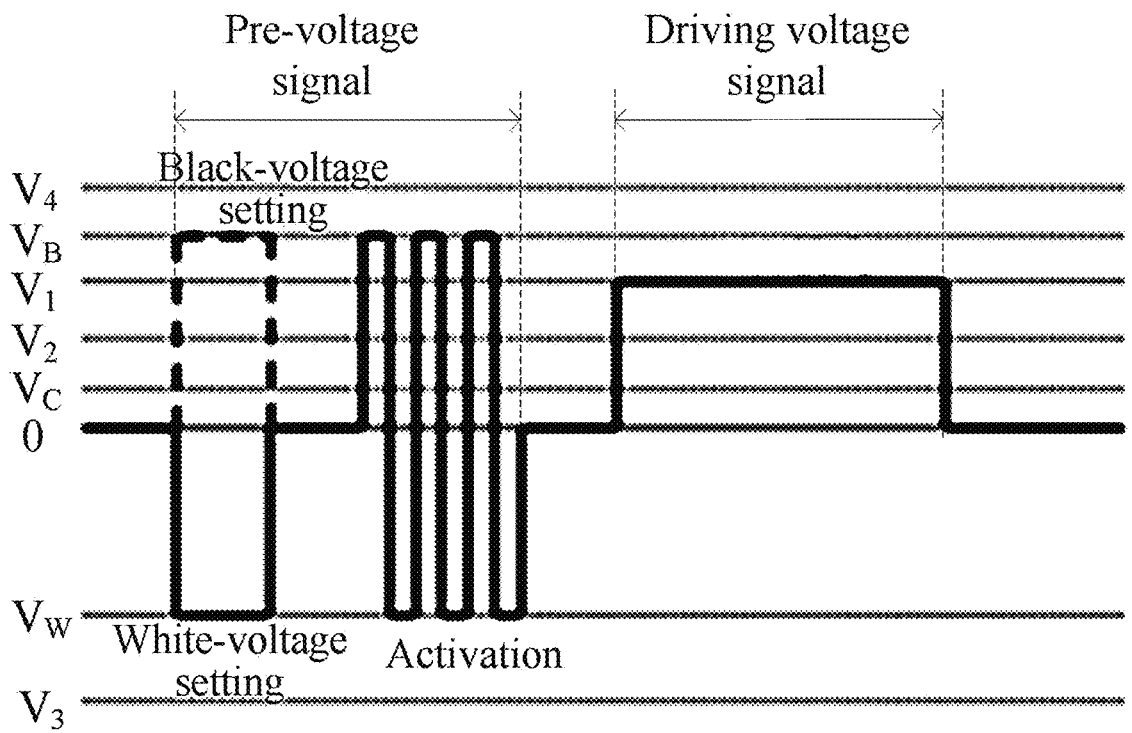
FIG. 4A is a timing diagram of driving signals of a reflective color filter substrate according to some embodiments of the disclosure in a first mode.
Figure 4B:
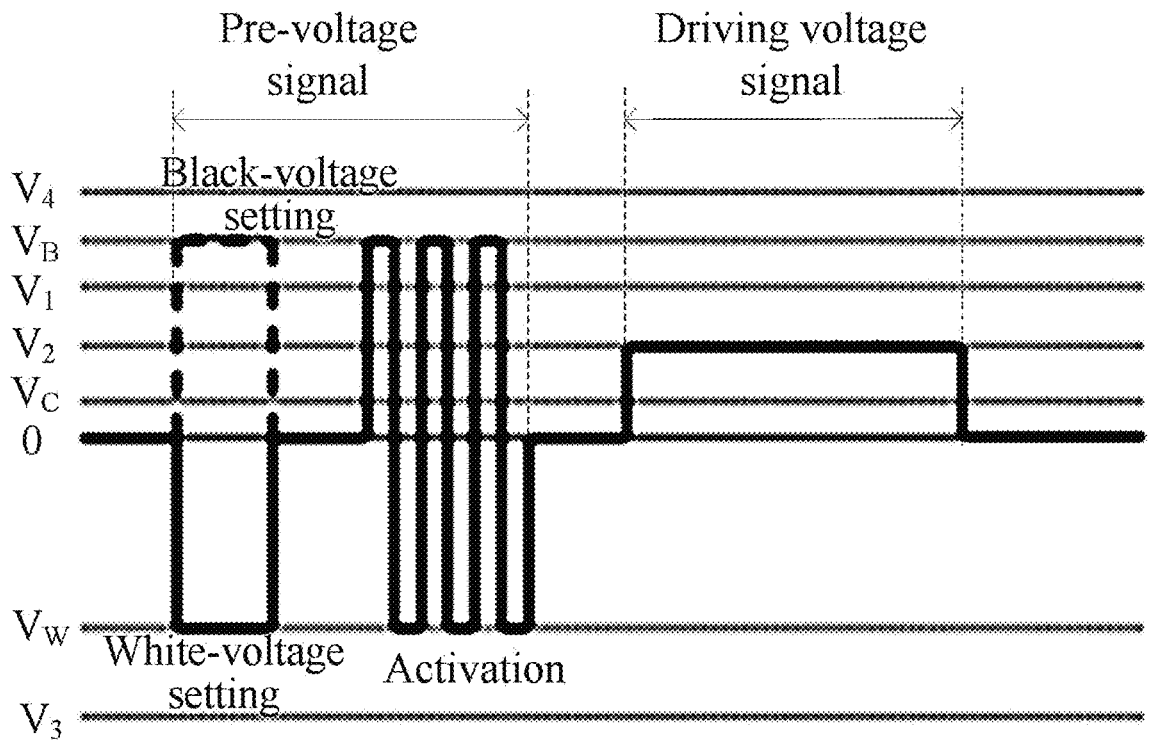
FIG. 4B is a timing diagram of driving signals of the reflective color filter substrate as illustrated in FIG. 4A in a second mode.
Figure 4C:
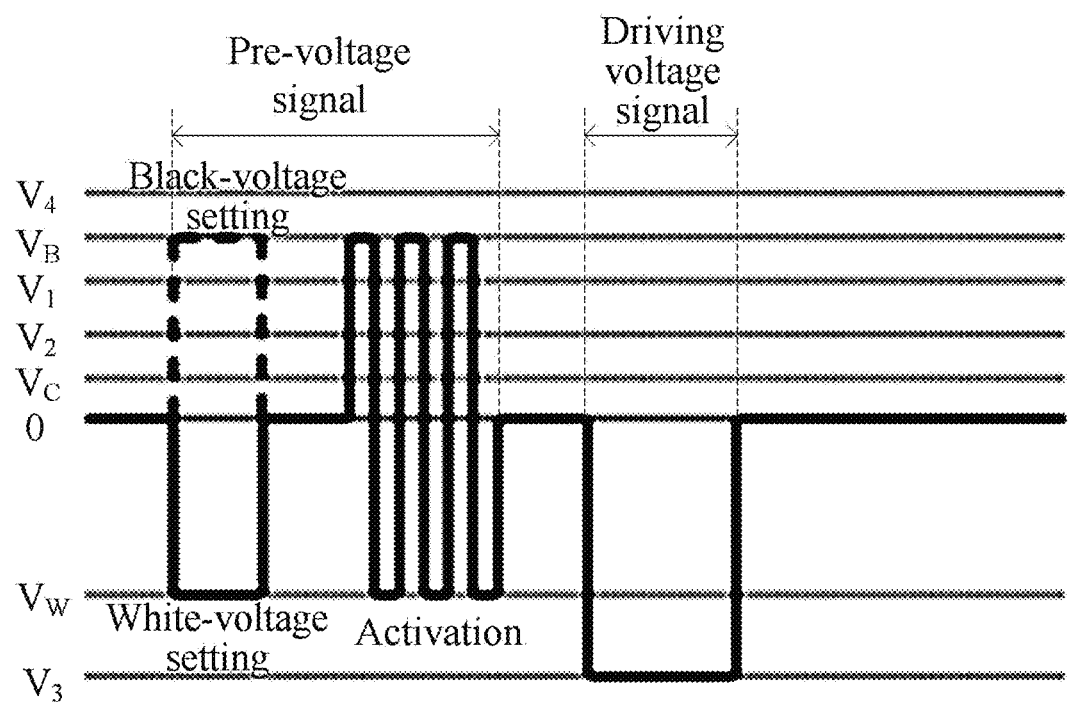
FIG. 4C is a timing diagram of driving signals of the reflective color filter substrate as illustrated in FIG. 4A in a third mode.
Figure 4D:
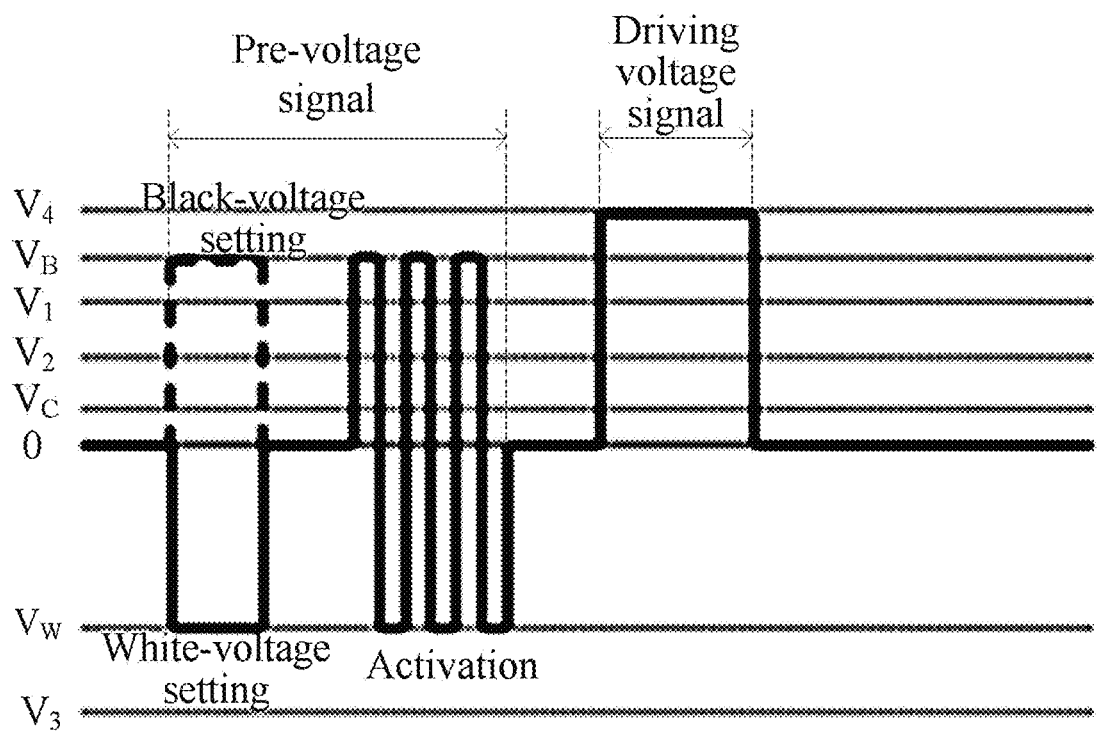
FIG. 4D is a timing diagram of driving signals of the reflective color filter substrate as illustrated in FIG. 4A in a fourth mode.

As illustrated in FIG. 4A, after the voltage signal $V_1$ has been applied to the first electrode 11 for a period of time, as illustrated in FIG. 3A, the monochromatic particles 521 can reach the first electrodes 11 in a separate zone from the other particles in the respective color-resist elements 5, thus enabling the RGB reflection mode; as illustrated in FIG. 4B, after the voltage signal $V_2$ has been applied to the first electrode 11 for a period of time, as illustrated in FIG. 3B, the monochromatic particles 521 and the white particles 522 can move to each other in the same zone in the respective color-resist elements 5, where the zone is more proximate to the first electrodes 11 than the black particles 523, thus enabling the RGBW reflection mode; as illustrated in FIG. 4C, after the voltage signal $V_3$ has been applied to the first electrode 11 for a period of time, as illustrated in FIG. 3C, the white particles 522 can reach the first electrodes 11 in a separate zone from the other particles in the respective color-resist elements 5, thus enabling the all-white reflection mode; and as illustrated in FIG. 4D, after the voltage signal $V_4$ has been applied to the first electrode 11 for a period of time, as illustrated in FIG. 3D, the black particles 523 can reach the first electrodes 11 in a separate zone from the other particles in the respective color-resist elements 5, thus enabling the all-black reflection mode.

In a second implementation, the absolute value of threshold voltage, and the mobility of the monochromatic particles 521 are greater than those of the black particles 523 respectively, and at this time, the driving method includes:

in the fourth mode, the fourth driving voltage is applied to the first electrode 11, and the reference voltage is applied to the second electrode 12, so that the fourth electric field is created between the first electrode 11 and the second electrode 12; the absolute of the fourth driving voltage is more than the absolute value of the threshold voltage of the black particles 523, and less than the absolute value of the threshold voltage of the monochromatic particles 521; and the absolute value of the first driving voltage, and the absolute value of the first driving voltage, and the absolute value of the second driving voltage respectively are more than the absolute value of the threshold voltage of the monochromatic particles 521.

Optionally, since the absolute value of the fourth driving voltage is more than the absolute value of the threshold voltage of the black particles 523, and less than the absolute value of the threshold voltage of the monochromatic particles 521, the black particles 523 can move, but the monochromatic particles 521 cannot move, under the action of the fourth driving voltage, so the black particles 523 can move to the first electrode 11 and occupy the position of the first electrode 11, thus enabling the black display mode. Since the absolute value of the first driving voltage, and the absolute value of the second driving voltage are more than the absolute value of the threshold voltage of the monochromatic particles 521, both the monochromatic particles 521 and the black particles 523 can move under the action of the first driving voltage and the second driving voltage, and since the mobility of the monochromatic particles 521 is higher than the mobility of the black particles 523, the monochromatic particles 521 can reach the first electrode 11 faster, thus enabling the color reflection mode, or the monochromatic particles 521 can move into the same zone as the white particles 522, thus enabling the white-color reflection mode.

It shall be noted that the "absolute value of voltage" above refers to the difference between the voltage and the reference voltage (which is zero voltage).

The movement distance of the electro-phoretic particles is equal to the product of the mobility, and the duration of the driving voltage, so the duration of each driving voltage (i.e., the period of time for which the electric field is applied) can be determined as a function of the real movement distance required of the electro-phoretic particles, and furthermore while the color filter substrate is operating in some mode, even after the duration of the driving voltage comes to the end, that is, the driving voltage (the electric field) is removed, the electro-phoretic particles are retained in the original state due to the bi-stable characteristic, that is, the color filter substrate still operates in the existing mode until it is switched to another mode. Accordingly the duration of each driving voltage above actually occupies the first fraction of the operating period of time in each mode.

The electro-phoretic particles are retained in the original state for a different period of time, there is also a different acting force between the electro-phoretic particles and a surrounding solution medium (solvent), and there is also a different viscosity of the solvent, so that the threshold voltage and/or the mobility of the electro-phoretic particles may vary. In order to avoid this from happening, a pre-voltage signal can be set before each driving voltage signal as illustrated in FIG. 4A to FIG. 4D, that is, before the driving voltage is applied to the first electrode 11 in each mode, the method can further include the step of applying a pre-voltage signal to the first electrode so that the electro-phoretic particles can be floating due to the pre-voltage signal, and thus, there is the same initial state of the respective color-resist elements 5 before the mode of the color filter substrate is updated (that is, the driving voltage signal is applied) each time, but also the threshold voltage and the mobility of the electro-phoretic particles will not vary before the driving voltage signal is applied each time.

By way of an example, as illustrated in FIG. 4A to FIG. 4D, the pre-voltage signal can include an activation voltage signal, where the product of a positive voltage waveform of the activation voltage signal, and the time, and the product of a negative voltage waveform thereof, and the time cancel off each other, and with the electro-phoretic particles, the electro-phoretic particles in the respective color-resist elements 5 can be actively floating, and there will be the same viscosity of the solvent in the respective color-resist elements 5, so that the threshold voltage and the mobility of the electro-phoretic particles can remain constant.

Furthermore, the pre-voltage signal can be further configured to initially set the electro-phoretic particles so that after the driving voltage is applied, the electro-phoretic particles can reach an expected zone under the action of the driving voltage. By way of an example, the pre-voltage signal is configured to make the white particles 522 and the monochromatic particles 521 arranged in separate zones in the second mode so that the second driving voltage is applied after the pre-voltage signal, and the white particles 522 and the monochromatic particles 521 can move to each other under the action of the second driving voltage to reach the same zone, thus enabling the white-color reflection mode.

By way of an example, as illustrated in FIG. 4A to FIG. 4D, the pre-voltage signal can include a white- or black-voltage setting signal, and the black-voltage is the threshold voltage $V_B$ of the black particles, and the white-voltage is the threshold voltage $V_W$ of the white particles. With the white- or black-voltage setting signal, the initial position of the electro-phoretic particles can be set so that after the driving voltage is applied, the electro-phoretic particles can reach an expected zone under the action of the driving voltage; and also with the white- or black-voltage setting signal, direct current can be balanced in each mode to thereby avoid an afterimage from occurring while switching between the modes. For example, the product of a period of time of the white- or black-voltage setting signal, and the white- or black-voltage can be set equal to the product of a period of time of the waveform of the driving voltage, and the driving voltage in each mode to thereby balance direct current.

By way of an example, as illustrated in FIG. 4A to FIG. 4D, when the driving voltage in the first mode, the second mode, the third mode, and the fourth mode is V1, V2, V3, and V4 respectively, the respective pre-voltage signals in the first mode, the second mode, and the fourth mode can be the white-voltage setting signal ($V_W$), and the pre-voltage signal in the third mode can be the black-voltage setting signal ($V_B$).

In a third aspect, some embodiments of the disclosure provide a display panel including the reflective color filter substrate according to any one of the embodiments above of the disclosure.

As illustrated in FIG. 5A to FIG. 5D, for example, the display panel includes a transmission solution crystal display module 60, and a circularly polarizing structure 70 located on a light exit side of the transmission solution crystal display module 60, and the reflective color filter substrate 80 is located on the side of the transmission solution crystal display module 60 away from the circularly polarizing structure 70. Particularly in the display panel, the circularly polarizing structure 70 side is the light exit side, and also a light incidence side, one sides of the first electrodes 11 in the reflective color filter substrate 80 are arranged facing the display module 60, and after light rays incident on the circularly polarizing structure 70 side are selectively reflected by the reflective color filter substrate 80, they can exit the circularly polarizing structure 70 side again, so that an image is displayed.

Figure 5A:
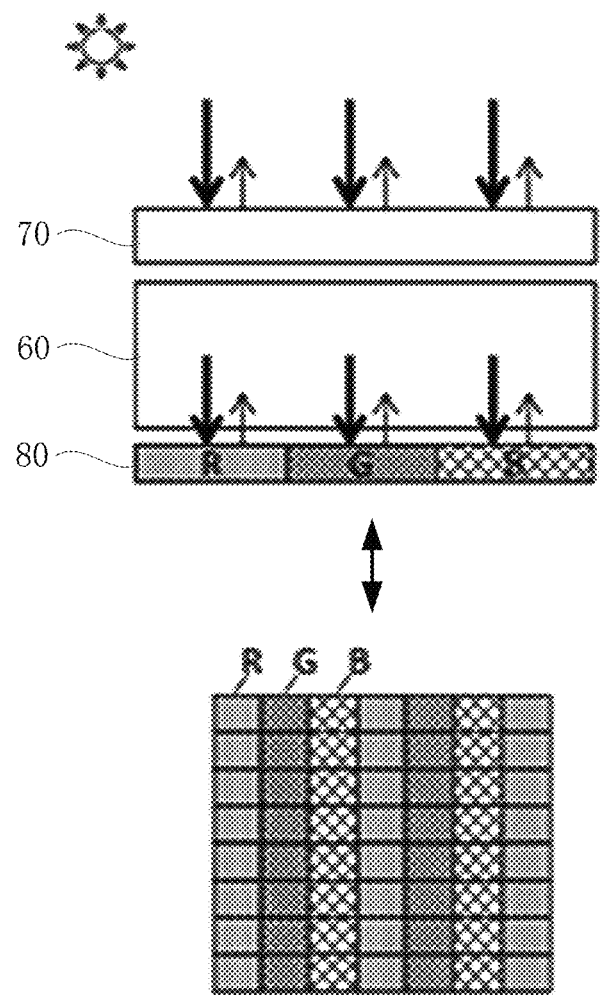
FIG. 5A is schematic structural diagrams of a part of a reflective color filter substrate according to some embodiments of the disclosure in a first mode in a sectional view and a corresponding top view.
Figure 5B:
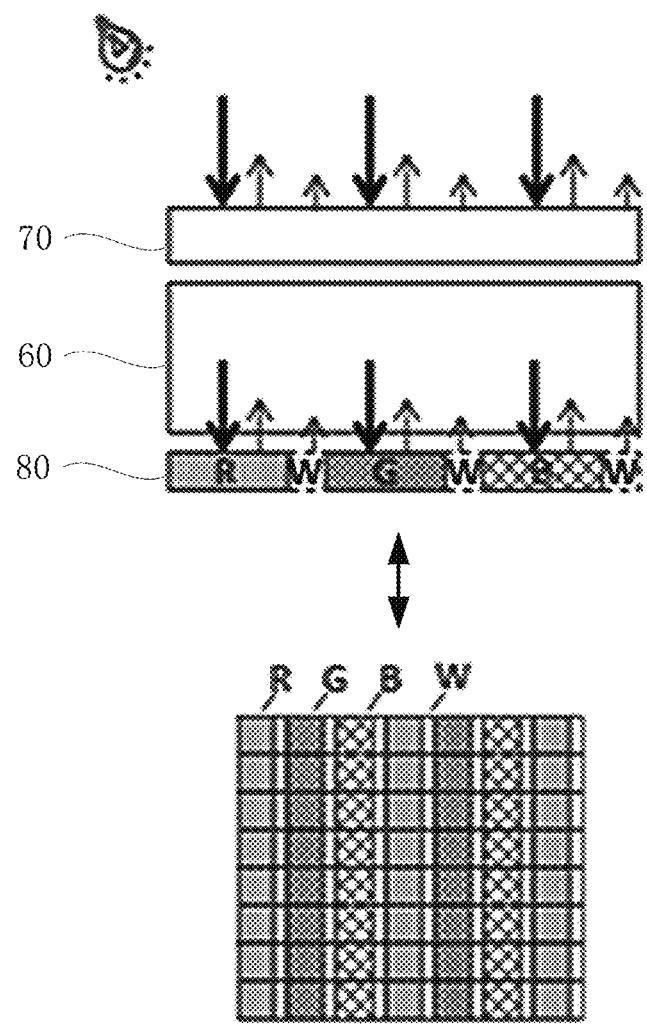
FIG. 5B is schematic structural diagrams of a part of the reflective color filter substrate as illustrated in FIG. 5A in a second mode in a sectional view and a corresponding top view.
Figure 5C:
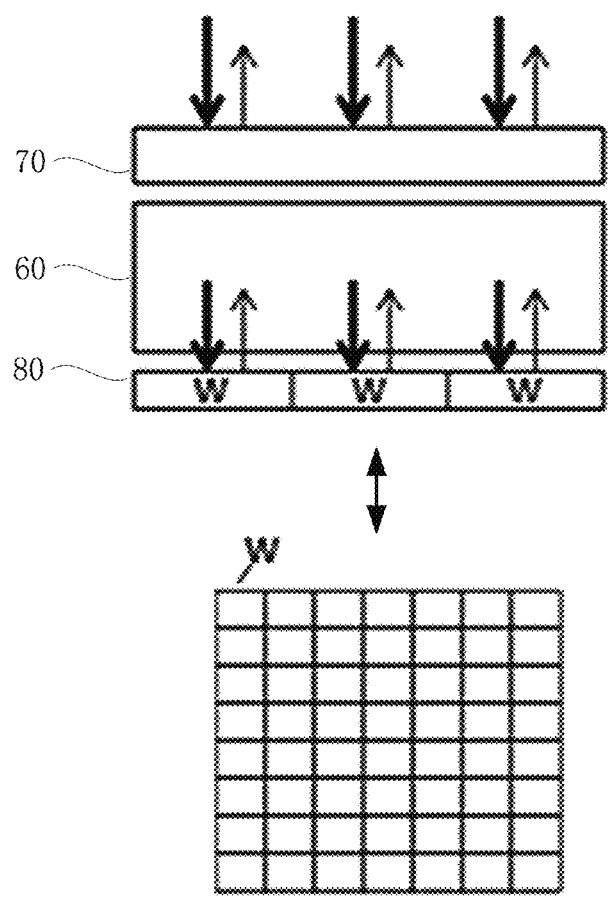
FIG. 5C is schematic structural diagrams of a part of the reflective color filter substrate as illustrated in FIG. 5A in a third mode in a sectional view and a corresponding top view.
Figure 5D:
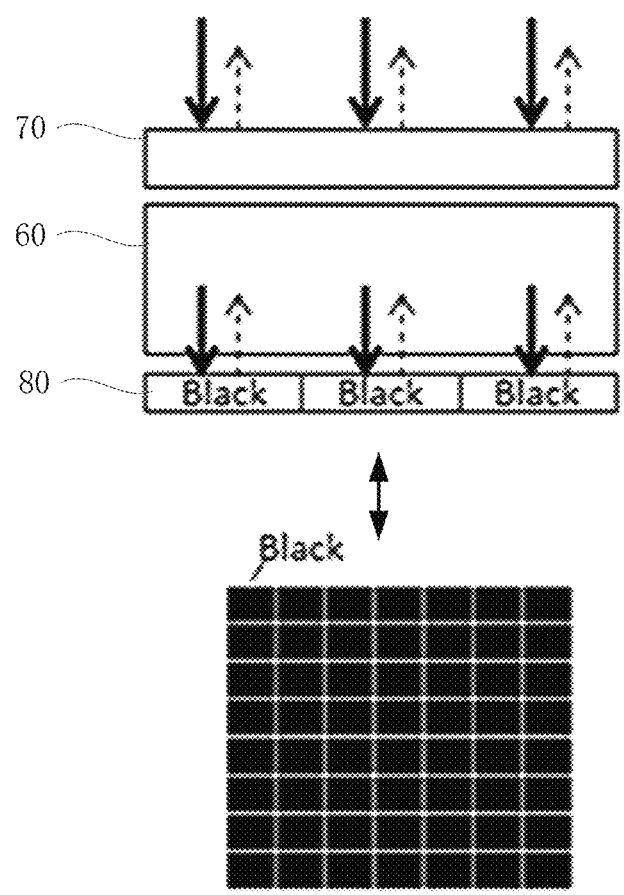
FIG. 5D is schematic structural diagrams of a part of the reflective color filter substrate as illustrated in FIG. 5A in a fourth mode in a sectional view and a corresponding top view.

As illustrated in FIG. 5A, while the reflective color filter substrate 80 is operating in the RGB reflection mode (the first mode), the display panel operates in the all-color RGB display state, which is applicable under bright outdoor sunlight; as illustrated in FIG. 5B, while the reflective color filter substrate 80 is operating in the RGBW reflection mode (the second mode), the display panel operates in the all-color RGBW display state, which is applicable under dark indoor light; as illustrated in FIG. 5C, while the reflective color filter substrate 80 is operating in the all-white (W) reflection mode (the third mode), the display panel operates in the all-white display state; and as illustrated in FIG. 5D, while the reflective color filter substrate 80 is operating in the all-black (B) reflection mode (the fourth mode), the display panel operates in the all-black state.

In a fourth aspect, some embodiments of the disclosure provide a display device including the display panel according to the embodiment above of the disclosure.

In the electrically adjustable reflective color filter substrate, reflective display panel, and reflective display device, the color filter substrate includes integrated electrowetting display elements or electronic paper display elements so that the color filter substrate can be adjusted to the all-color RGB reflection mode in an environment with bright outdoor light rays, and to the hybrid white-color RGBW reflection mode in an environment with dark indoor light rays, to thereby improve the universality and flexibility of the display device so as to satisfy more display demands. Moreover the color filter substrate can be further adjusted to the all-white or -black mode as needed to thereby improve in effect the brightness of a white image on the display device, or suppress in effect light from being leaked while a black image is being displayed on the display device, but also improve the contrast of the display device, and lower power consumption of the display device.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A reflective color filter substrate, comprising color-resist elements arranged in an array, wherein the color-resist elements comprises a first electrode and a second electrode arranged opposite to each other, and a color-resist structure located between the first electrode and the second electrode; and in the color-resist elements:
the first electrode is a light-transmission electrode;
the first electrode and the second electrode are configured to generate a first electric field, and the color-resist elements are configured to be driven by the first electric field to reflect light rays incident on the first electrode as monochromatic light; and
the first electrode and the second electrode are configured to generate a second electric field, and the color-resist elements are configured to be driven by the second electric field to reflect the light rays incident on the first electrode as hybrid light of monochromatic light and white light;
wherein the first electrode and the second electrode are further configured to generate a third electric field, and the color-resist elements are configured to be driven by the third electric field to reflect the light incident on the first electrode as white light;
wherein the second electrodes are light-reflective electrodes;
the color-resist structure comprises a dielectric layer, a hydrophobic layer, and monochromatic non-polar solution and transparent polar solution located between the hydrophobic layer and the first electrode, arranged successively from the second electrode to the first electrode;
the reflecting color filter substrate further comprises blocking walls located between the color-resist elements to isolate the solution of adjacent color-resist elements from each other; and
the non-polar solution in the color-resist elements is driven by the first electric field to be spread on the hydrophobic layer, and to cover all of the hydrophobic layer, and driven by the second electric field to be accumulated toward one of the blocking walls, and to cover a part of the hydrophobic layer.

2. The reflective color filter substrate according to claim 1, wherein the first electrodes of the color-resist elements are structured integral, and the second electrodes of the color-resist elements are structured integral.

3. The reflective color filter substrate according to claim 1, wherein the blocking walls are black.

4. The reflective color filter substrate according to claim 1, wherein the non-polar solution in the color-filter elements is driven by a third electric field to be adhered on one of the blocking walls.

5. The reflective color filter substrate according to claim 4, wherein a ratio of an area of the orthographic projection of the non-polar solution onto the hydrophobic layer to an area of the hydrophobic layer corresponding to the color-resist elements is from 10% to 50% due to a driven of the second electric field, and a ratio of the area of the orthographic projection of the non-polar solution onto the hydrophobic layer to the area of the hydrophobic layer corresponding to the color-resist elements is not greater than 5% due to the driven of third electric field.

6. A display panel, comprising the reflective color filter substrate according to claim 1.

7. The display panel according to claim 6, further comprises a transmission solution crystal display module, and a circularly polarizing structure located on a light exit side of the transmission solution crystal display module; and
the reflective color filter substrate is located on a side of the transmission solution crystal display module away from the circularly polarizing structure.

8. A display device, comprising the display panel according to claim 6.

9. A method for driving the reflective color filter substrate according to claim 1, the color filter substrate being capable of operating in a first mode and a second mode, wherein the method comprises:
applying a first driving voltage to the first electrode, and a reference voltage to the second electrode in the color-resist elements in the first mode so that the first electric field is generated between the first electrode and the second electrode, and light rays incident on the first electrode are reflected as monochromatic light; and
applying a second driving voltage to the first electrode, and the reference voltage to the second electrode in the color-resist elements in the second mode so that the second electric field is generated between the first electrode and the second electrode, and the light rays incident on the first electrode are reflected as hybrid light of monochromatic light and white light.

10. The driving method according to claim 9, wherein the color filter substrate being further capable of operating in a third mode of the color filter substrate, and the driving method further comprises:

applying a third driving voltage to the first electrode, and the reference voltage to the second electrode in the color-resist elements in the third mode so that a third electric field is generated between the first electrode and the second electrode, and the light rays incident on the first electrode are reflected as white light.

11. The driving method according to claim 10, wherein the color-resist structure in the color filter substrate comprises electro-phoretic solution, and electro-phoretic particles distributed in the electro-phoretic solution; the electro-phoretic particles comprise monochromatic particles and white particles; a charge polarity of the white particles is opposite to a charge polarity of the monochromatic particles; wherein the white particles are proximate to the first electrode side, and the monochromatic particles are proximate to the second electrode side, due to a driven of the third electric field; and wherein the reference voltage is ground voltage, and a polarity of the first driving voltage is opposite to that of the third driving voltage.

12. The driving method according to claim 11, wherein the electro-phoretic particles in the color filter substrate further comprises black particles, a charge polarity of the black particles is identical to that of the monochromatic particles;

the color filter substrate being further capable of operating in a fourth mode of the color filter substrate; in the fourth mode, a fourth electric field is generated between the first electrode and the second electrode in the color-resist elements, wherein the black particles are proximate to the first electrode side, and the particles in other colors are proximate to the second electrode side, due to a driven of the fourth electric field; and an absolute value of threshold voltage, and a mobility of the black particles are greater than those of the monochromatic particles respectively, and the driving method comprises:

applying a fourth driving voltage to the first electrode, and the reference voltage to the second electrode in the color-resist elements in the fourth mode so that the fourth electric field is generated between the first electrode and the second electrode, wherein an absolute value of the fourth driving voltage is greater than the absolute value of the threshold voltage of the black particles, and an absolute value of the first driving voltage, and an absolute value of the second driving voltage are greater than the absolute value of the threshold voltage of the monochromatic particles, and less than the absolute value of the threshold voltage of the black particles respectively, or an absolute value of threshold voltage, and a mobility of the monochromatic particles are greater than those of the black particles respectively, and the driving method comprises:

applying a fourth driving voltage to the first electrode, and the reference voltage to the second electrode in the color-resist element in the fourth mode so that the fourth electric field is generated between the first electrode and the second electrode, wherein an absolute value of the fourth driving voltage is greater than the absolute value of the threshold voltage of the black particles, and less than the absolute value of the threshold voltage of the monochromatic particles, and the absolute value of the first driving voltage, and the absolute value of the second driving voltage respectively are greater than the absolute value of threshold voltage of the monochromatic particles.

13. The driving method according to claim 12, wherein before the driving voltage is applied to the first electrode in the first mode, the second mode, the third mode or the fourth mode, the method further comprises: applying a pre-voltage to the first electrode, wherein the pre-voltage is configured to make the electro-phoretic particles float.

14. The driving method according to claim 13, wherein the pre-voltage is further configured to separate the white particles and the monochromatic particles in a direction from the first electrode to the second electrode in the second mode.

* * * * *